United States Patent
Boivie et al.

(10) Patent No.: US 11,496,285 B2
(45) Date of Patent: Nov. 8, 2022

(54) CRYPTOGRAPHIC SIDE CHANNEL RESISTANCE USING PERMUTATION NETWORKS

(71) Applicant: International Business Machines Corporation, Armonk, NY (US)

(72) Inventors: Richard Harold Boivie, Monroe, CT (US); Daniel Joseph Friedman, Sleepy Hollow, NY (US); Charanjit Singh Jutla, Elmsford, NY (US); Ghavam G. Shahidi, Pound Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/259,700

(22) Filed: Sep. 8, 2016

(65) Prior Publication Data

US 2018/0069693 A1  Mar. 8, 2018

(51) Int. Cl.
*H04L 9/00* (2022.01)
*H04L 9/32* (2006.01)
*H04L 9/06* (2006.01)
*G06F 21/72* (2013.01)

(52) U.S. Cl.
CPC .............. *H04L 9/003* (2013.01); *G06F 21/72* (2013.01); *H04L 9/0643* (2013.01); *H04L 9/3271* (2013.01)

(58) Field of Classification Search
CPC ..... H04L 9/003; H04L 9/0643; H04L 9/3271; G06F 21/72
See application file for complete search history.

(56) References Cited

U.S. PATENT DOCUMENTS

| 6,937,728 | B1 | 8/2005 | Abe et al. |
| 8,732,468 | B2 | 5/2014 | Roy et al. |
| 9,143,317 | B2 | 9/2015 | Chevallier-Mames et al. |
| 2007/0234068 | A1* | 10/2007 | Silverbrook .......... G06F 21/755 713/189 |
| 2010/0287374 | A1* | 11/2010 | Roy ........................ G06F 21/70 713/171 |
| 2012/0311349 | A1* | 12/2012 | Collins .................... H04L 9/06 713/189 |

(Continued)

FOREIGN PATENT DOCUMENTS

EP        2 148 462 A1      1/2010

*Primary Examiner* — Noura Zoubair
(74) *Attorney, Agent, or Firm* — Jeffrey S. LaBaw, Esq.; McGinn I.P. Law Group, PLLC

(57) ABSTRACT

A method (and structure) includes receiving a challenge for an authentication, in a chip having stored in a memory device therein a secret to be used in an authentication attempt of the chip by an external agent. The chip includes a hardware processing circuit to sequentially perform a processing related to the secret. The secret is retrieved from the memory device and processed in the hardware processing circuit in accordance with information included in the received challenge. The result of the processing in the hardware processing circuit is transmitted as a response to the challenge. The hardware processing circuit executes in a parallel manner, thereby reducing a signal that can be detected by an adversary attempting a side channel attack to secure the secret.

20 Claims, 4 Drawing Sheets

(56) References Cited

U.S. PATENT DOCUMENTS

| | | | |
|---|---|---|---|
| 2013/0061303 A1* | 3/2013 | Hart | G06F 21/33 726/6 |
| 2015/0270973 A1* | 9/2015 | Duplys | H04L 9/003 380/28 |
| 2016/0026826 A1* | 1/2016 | Kocher | G06F 21/602 713/1 |

* cited by examiner

CRYPTOGRAPHIC SIDE CHANNEL RESISTANCE USING PERMUTATION NETWORKS

BACKGROUND

The present invention relates to security, and more specifically, to solving the problem of leaking secret information on a hardware device through side channels such as power and/or electromagnetic radiation during a side channel attack, by forming one or more permutations of the secret and processing, in a parallel manner, the permutations in hardware circuitry.

In cryptography, a side channel attack is an attack to gain secret information from the physical characteristics of a cryptosystem, rather than by brute force or theoretical weaknesses in the algorithms. Examples of physical characteristics that might be monitored during a side channel attack include such parameters as timing information, power consumption, electromagnetic (EM) leaks, or even sound, any of which can provide extra information which can be detected by an adversary and possibly exploited to break the system. The recent rise in web applications and software-as-a-service has also significantly raised concern about the possibility of side channel attacks on the web, even when transmissions between a web browser and server are encrypted through HTTPS (secure protocol for Hypertext Transfer Protocol (HTTP)) or WiFi (wireless local area network) encryption.

Thus, side channel attacks are distinguished from attacks based on attempting to break a cryptosystem by deceiving or coercing people with legitimate access or attacks on computer systems themselves to obtain, for example, cryptographic key information stored on a computer.

One conventional method to solve the leakage problem uses secret sharing of the bits involved in each step of a cryptographic operation which may use the secret. This method causes a significant overhead, but the solution may still not adequately protect the secret from EM leakage.

There are other ad-hoc means that attempt to address and reduce side-channel attacks, such as running a noisy circuit in parallel. However, such techniques can easily be defeated by simply collecting more data. Finally, there is a conventional technique based on simply changing the secret often enough, but this method is not possible in systems where the secret cannot be changed.

SUMMARY

The approach of the present invention to side channel protection is focused on a particular cryptographic application of "cryptographic authentication" during which a challenger provides a challenge, such as, exemplarily, a 128-bit number, and the device requesting authentication then hashes its secret along with the challenge, using a cryptographic hash function such as SHA-2, and sends the result back to the challenger for authentication. A "legitimate" challenger will maintain in its database the same secret held by the device seeking authentication, so that the challenger can also compute the same result and check if the two results are the same. If the challenger does not calculate the same result, the device is not authenticated. If the two results match, the device is authenticated by the challenger.

The present invention modifies this generic challenge/response protocol by introducing, as a mechanism for shielding against side channel attacks, a step of permuting the secret that is stored in a memory of the device, using a hardware permutation network such as a Benes network or a butterfly network. The permutation to be used is obtained from the challenge sent by the challenger, for example, by hashing the challenge by using SHA-2 itself. This hashing/permutation, as occurring as a parallel processing in a hardware circuit in the device, with a final result sent from the device to the challenger, has the effect that the processing appears random to any adversary that might be monitoring in a side channel attack. However, since the secret is also known to the challenger, if the challenger is legitimate, the challenger can then calculate a corresponding permutation and hashing to compare to the result received from the device, to determine authenticity of the requester.

In contrast, if the challenger should be a side channel attacker sending the device a challenge, the output from the device cannot be deciphered because the challenger would not know the device secret and, as will be explained later, it is statistically improbable for the adversary to be able to validate any hypothesis about the secret key segments. Thus, a beneficial effect of performing the initial permutation is that each side channel sample that an adversarial challenger might obtain is based on a permutation that inherently provides isolation from the secret being protected, thereby drastically reducing value of any information that might be obtained during a side channel attack.

Although the concepts of the present invention are explained using an entity such as a bill representing monetary value, it should be clear that the techniques described herein would be readily adapted to other embodiments such as credit or debit cards having an embedded chip, often used by consumers to interact with point of sale (POS) and automated teller machines (ATM) terminals. Other non-limiting embedded-chip technologies are discussed later, some of which could likewise benefit from the authentication technique disclosed by the present invention.

DETAILED DESCRIPTION

Figure 1:
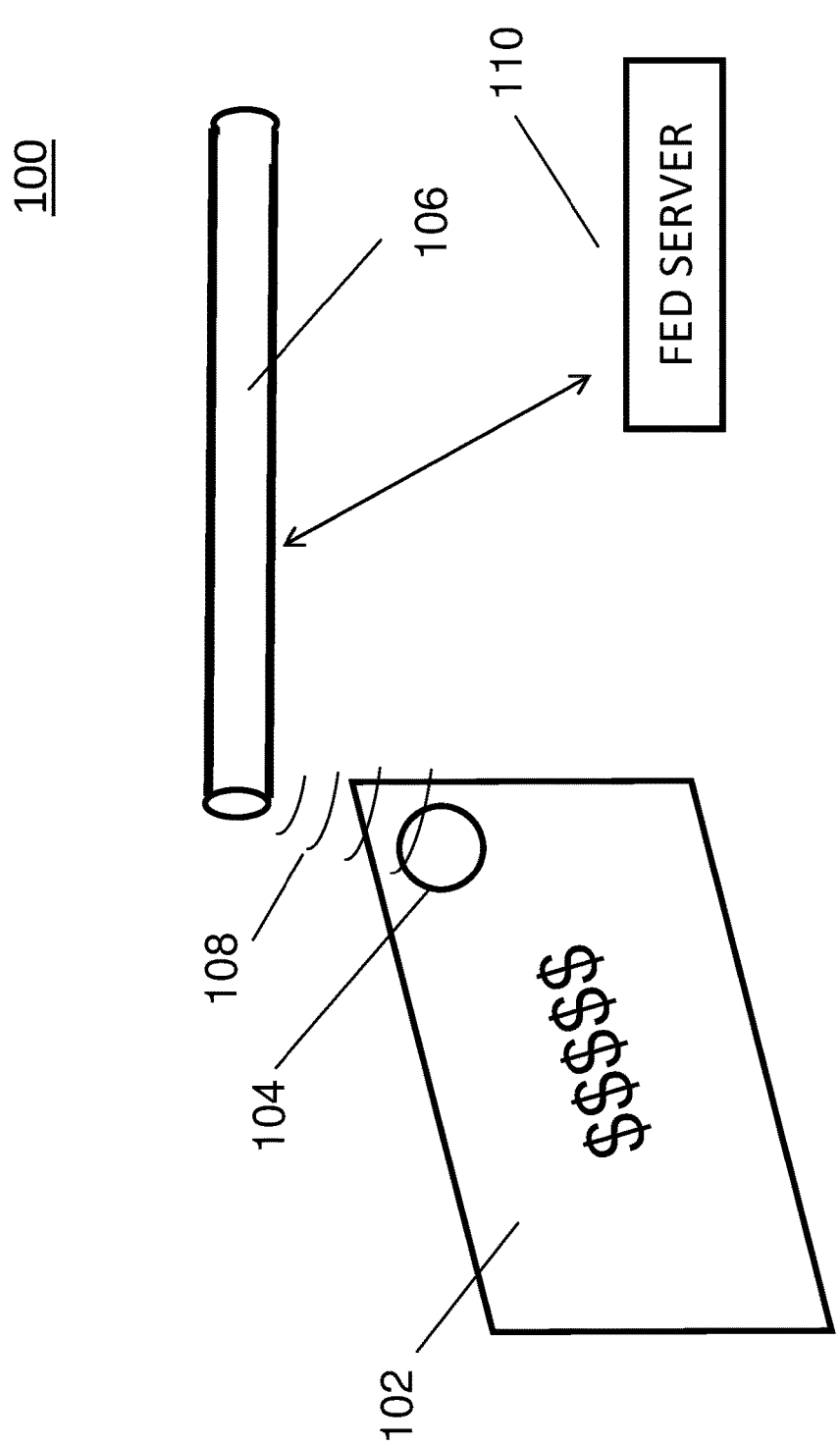
FIG. 1 shows an exemplary scenario 100 in which a monetary bill 102 is potentially subject to side channel attacks.

With reference beginning with FIG. 1, exemplary embodiments of the present invention will now be described. In an exemplary scenario 100 demonstrated by FIG. 1, an object 102 such as a bill or document representing or having monetary value has an embedded chip 104 in which secret information k (e.g., the object's key) is stored, as intended to be used to determine the authenticity of the object 102. This secret is different for each chip and is randomly chosen or set during either manufacturing time or by an authorizing agent, also referred to herein as the Fed, after the chip has been manufactured. The secret value once set should not be malleable, other than possibly small errors introduced due to use and mishandling over multiple years.

The secret k for each bill is also kept at the Fed, which is how the Fed would authenticate an object 102 as being an authentic bill. Each chip also has a serial number s (e.g., maximum 128-bit). The secret k on a chip with serial number s is denoted hereinafter as $k_s$. These values are stored as pairs on a Fed database. The secret k on the chip should be in a tamper-proof enclosure, so that any attempt to get to it (without the proper protocol) would erase it. Should an extremely expensive procedure (per chip) allow an adversary to get to the secret, then the adversary could possibly produce multiple bills with the same serial number and secret, but not too many, as such multiple duplication would easily be detected by the Fed as an anomaly, so that the Fed would be able to disable that serial number/secret. Chip 104 has no internal power supply and is dependent upon an external device 106 that emanates EM energy 108 with predetermined specific parameters, such as frequency and amplitude, to provide temporary power to the chip 104, when located within a predetermined proximity to the chip 104, and to permit the chip 104 to broadcast information related to authentication of the secret stored in a memory of the chip 104, as based on the hashing/permutation method described herein. This concept of using an external power source in the present invention is similar to that of the radio-frequency identifiers (RFID) technology conventionally used to automatically identify and track tags attached to objects, for product identification, inventory tracking, and security. RFID has been adapted for many other uses, including, for example, electronic locks in motels in which quests are issued an RFID card as a room key, identification badges for personnel identification, microchips implanted in livestock or pets for positive identification of animals, as well as the use of chips on automated teller machine (ATM) cards. Thus, although the present invention is described in the context of an object representing monetary value, it should be clear that the concepts described herein are readily adaptable to other applications in which a secret is stored so that it might be desirable to protect against side channel attacks.

In the exemplary embodiment used to explain the present invention, wand 106 is a device held at each local bank which supplies power to the chip 104 and also has the capability to do pre-programmed instructions, such as generating a 128-bit random number as a challenge, and interact with both the chip and a central authority 110. The method described herein resists side channel attacks by providing hardware circuitry in the chip 104 that executes security authentication processing in a parallel manner, such that an observer would have difficulty deciphering any useful information from the overall processing in these parallel procedures.

In contrast to hardware circuitry, should this same permutation-based processing be software-implemented in chip 104, the software-based processing would or could be serial, and an adversary could more easily listen in and possibly be able to decipher side channel information much easier. Therefore, a key feature of the present invention is that the chip 104 in the object 102 is implemented at least partially in hardware rather than software, since hardware circuitry would provide "noisy" parallel processing. It is noted, however, that portions of the chip circuit, such as a control circuit, a controller, or a finite state machine might use serial control or sequencing, but such serial sequencing would not involve any processing of the actual content of the secret k.

In one exemplary embodiment, for each authentication procedure with a bill 102 (or a stack of bills), the wand 106 will choose a random 128-bit number c, and send c to the chip(s) 104. The same number c can be used for all chips in a batch, if multiple bills/chips are involved. Each chip 104 then computes (reading from left to right, and where "SHA-2" refers to Secure Hash Algorithm 2, and where, again, s is the chip's serial number with corresponding secret $k_s$):

$v \leftarrow \text{SHA-2}(c)$; $u \leftarrow \text{SHA-2}((v, s, k_s))$; $\text{Output} \leftarrow \text{SHA-2}(u, v)$.

The chip(s) 104 then send their Output (along with s) to the wand 106, which then forwards it to the Fed (along with c and serial numbers s) for verification. The output will be referred to as the message authentication code (MAC).

Figure 2:
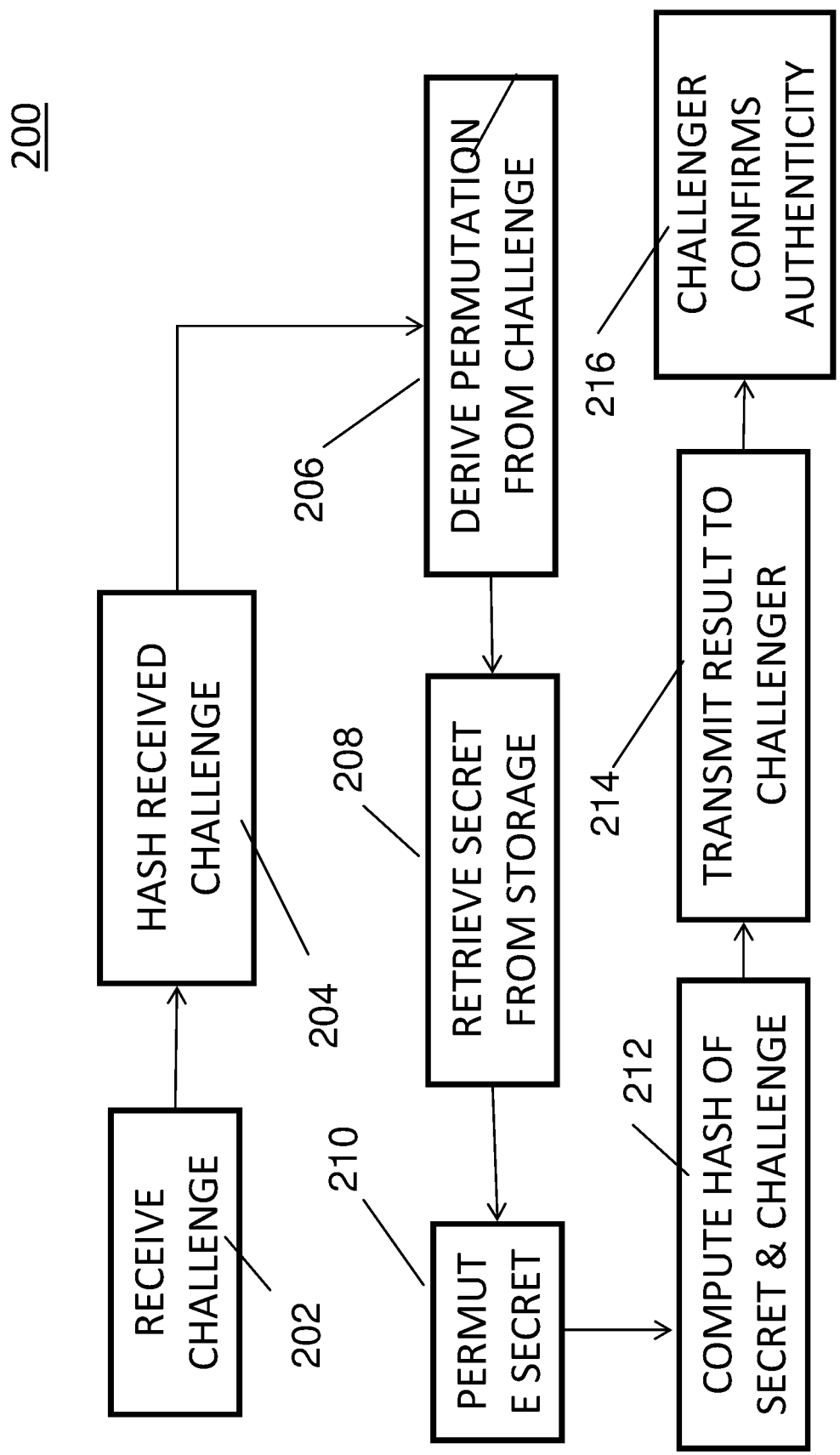
FIG. 2 shows in flowchart format 200 key steps of a first exemplary embodiment of the present invention.

For this sort of authentication protocol, the present invention involves, as shown in the flowchart 200 of FIG. 2, permuting the secret that is stored in the device (e.g., chip 104), using a permutation network such as a butterfly network or Benes network.

However, for clarity before proceeding further in explaining exemplary embodiments of the present invention, various terms will first be explained, as intended for better understanding of key aspects of the present invention.

First, as previously briefly mentioned, the term "SHA-2" refers to Secure Hash Algorithm 2, a set of cryptographic hash functions designed by the National Security Agency (NSA). As is well known in the art, cryptographic hash functions are mathematical operations run on digital data, and standard circuits, both hardware and software, are well known in the art (chip 104 of the present invention explicitly uses a hardware circuit, in order to take advantage of having processing occur in a parallel manner). The data's integrity can be determined by comparing the computed hash, which is the output from execution of the hash algorithm, to a known and expected hash value. For example, by computing the hash of a downloaded file and comparing the result to a previously published hash result, one can determine whether a modification or tampering has occurred to the download.

SHA-2 includes significant changes from its predecessor, SHA-1. The SHA-2 family consists of six hash functions with digests (hash values) that are 224, 256, 384 or 512 bits, meaning that SHA-2 includes: SHA-224, SHA-256, SHA-384, SHA-512, SHA-512/224, SHA-512/256. Although SHA-2 is used to explain the present invention, one of ordinary skill would readily recognize that other hashing standards could be used in the method of the present invention.

The term "permute" or "permutation" refers to a re-ordering of components of a set. More precisely, the notion of permutation relates to the act of arranging all the members of a set into some sequence or order, or, if the set is already ordered, rearranging (reordering) its elements. For example, written as tuples, there are six permutations of the set {1,2,3}, namely: (1,2,3), (1,3,2), (2,1,3), (2,3,1), (3,1,2), and (3,2,1).

Figure 3:
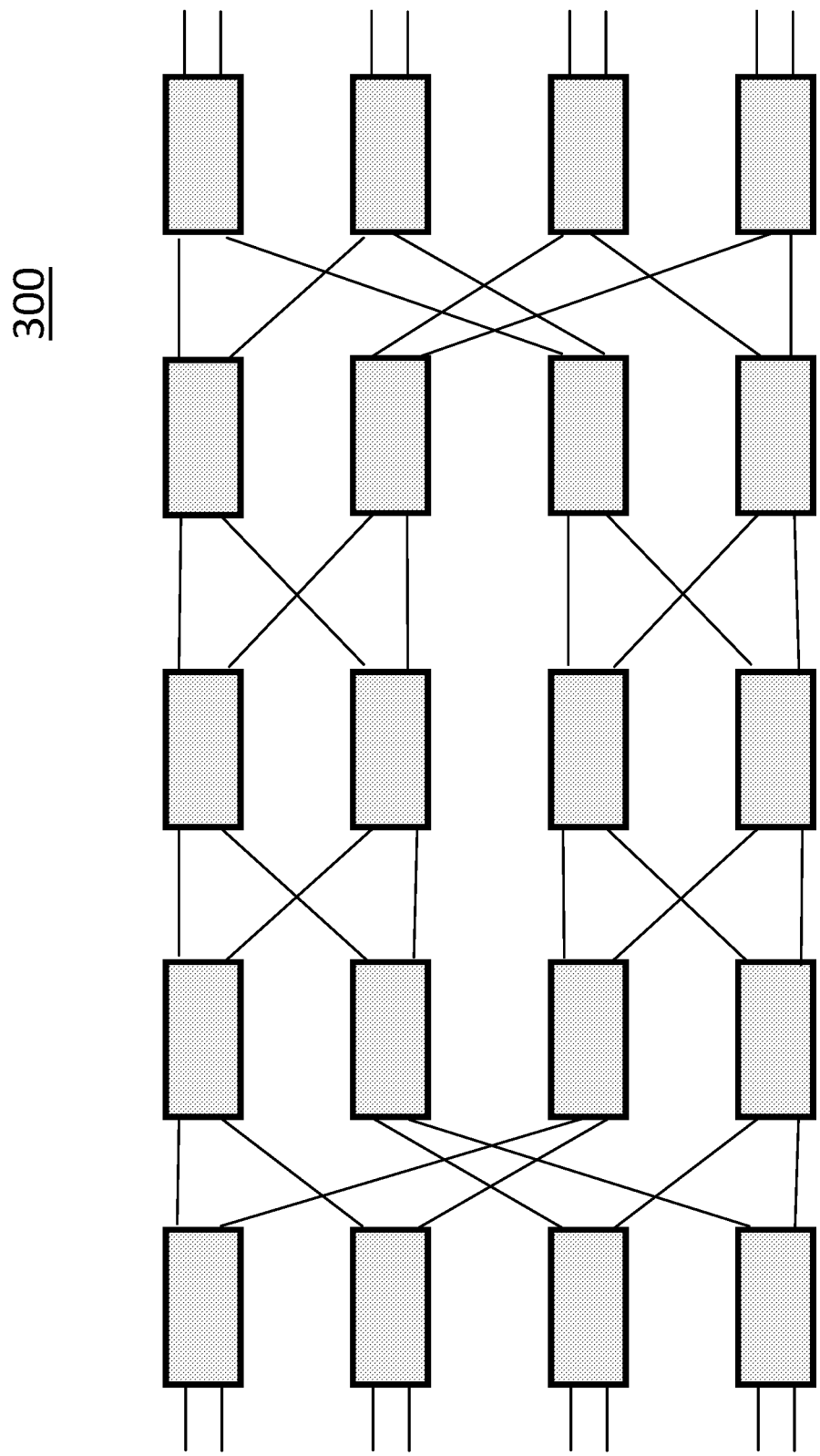
FIG. 3 shows an exemplary 8-bit Benes network.

A "permutation network" as used herein refers to a circuit that performs permutations using multiple switching stages, as usually constructed from a single type of modular switching element. Two such permutation networks that are well known in the art, exemplarily used in the description of the present invention, are the butterfly network and the Benes network, although it should be clear to one of ordinary skill in the art that any known permutation circuit could be used to implement the permutation functions of the present invention, where the permutation circuit in the chip 104 is hardware circuitry, as explained above. FIG. 3 shows exemplarily shows an 8-bit Benes network, the exemplary embodiment of the present invention uses a 128-bit Benes network.

Returning now to FIG. 2, the present invention modifies the generic authentication protocol sequence as the device 102 receives the challenge in step 202, typically as generated by the wand 106 using a random number generator. The received challenge permits the device 102 to determine the permutation by, in step 204, hashing the received challenge using an agreed-upon hash algorithm, such as SHA-2 itself, which hashing will become the basis for deriving a permutation code "assignment" by the challenger. Each possible permutation of 128 bits is specified by 13 rounds of 64 2 by 2 switches, thus requiring 13*64 bits. Since, SHA-2 outputs 256 bits, running SHA-2 repetitively four times produces enough bits to specify the permutation (i.e. 13*64 bits). In the context of the present invention, this is the permutation code.

In steps 208 and 210, the device 102 will retrieve its secret from memory, the object of the instant authentication event, and permute it in accordance with the received permutation code, by sending the secret through a permutation network such as a butterfly network or a Benes network in accordance with the permutation code supplied by the challenger. In step 212, the permuted secret and challenge is hashed, and, in step 214, the device sends the permuted secret and the challenge back to the challenger. This has the effect that the permutation is random looking, although known to the challenger as well as the device 102.

After the secret has been permuted, the usual authentication mechanism is performed by the challenger. Since the challenger knows the permutation code, the device's secret, and the challenge, it can then compute, in step 216, the same permutation, and hence the legitimate challenger will also arrive at the same final result. The beneficial effect of performing the permutation is that each side-channel sample that an adversarial challenger obtains is on a completely permuted secret, and it is statistically improbable for the adversary to be able to validate its hypothesis about the secret key segments.

Although the discussion above for the exemplary embodiment of FIG. 2 describes that the wand 106 generates a 128-bit random number for the challenge and sends it to the chip 104 as well as providing it to the Fed server 110 for purpose of authentication, it should be clear that the Fed server 110 could also be the source of the 128-bit challenge. In this variation, the wand 106 would send a request to the Fed server 110 to generate and transmit a 128-bit challenge, and the wand 106 would forward this challenge to the chip 104.

The Benes network (or any such permutation network) is also acting on the secret. However, since a permutation network is essentially an "exchange" network, the side channel information leak due to this operation is minimal, if any. More precisely, the permutation network consists of many 2 by 2 switches, with two input wires and two output wire and a single bit specifying whether the two inputs bits should go out in order or switched. Performing all the steps in each round of the permutation network in parallel further decreases the signal that can potentially be detected during a side channel attack.

Thus, in a specific instantiation of an exemplary embodiment of the present invention, there is one SHA-2 circuit, and it is used many times. There is also one permutation network (i.e., a 128-bit version of the Benes network shown in FIG. 3), and it is used only one time per challenge/authentication cycle.

A further additional counter-measure against side channel attacks that can be incorporated into the invention is to code each bit of the secret in two or any even multiple of bits. For example, 0 will be encoded as 01 and 1 will be encoded as 10. Thus, during the permutation step, for example, if the first two secret bits are 0 and 1, then they are encoded as 01 and 10, and if they are exchanged (as directed by the permutation), then 01 and 10 get exchanged. Whereas, if the first two secret bits were both 0, then 01 and 01 get exchanged.

Thus, assuming that the side channel characteristics of identical gates (for example two OR gate or two NAND gate) have only negligible differences, this similarity will lead to negligible overall side channel information. The main advantage of this scheme is that it is tailored to the particular cryptographic authentication method, and for such a scheme this gives a simple and highly effective side channel countermeasure, whereas other techniques being general-purpose require much more effort to obtain the same level of side channel resistance.

One specific exemplary protocol will now be described.

For the cryptographic hash function, this example will assume SHA-2. There are two parties, a small device and a central server. The latter acts as a challenger. Both of them share a secret, say a 128 bit number k. The secret is stored in the device in a READ-ONLY memory by being encoded as two or four bits. Thus, if the bits of k are $k\_0, k\_1, \ldots k\_127$, then each bit is encoded as two bits as follows. If a bit in s is 0 then it is stored as 01, and if the same bit in s is 1 it is stored as 10. Thus, 256 bits of memory is required to store 128 bits of k. We will refer to this encoded secret as array k, i.e. k[0], k[1] encode the 0-th bit of k, etc.

An Exemplary Protocol

1. The challenger initiates the protocol by sending a 128-bit challenge number, say c. As previously noted, the challenge number c can be generated either in a device used for local interface with a chip to be authenticated or in a remote server that determines authenticity.

2. (a) Upon receipt in the chip 104, the challenge c is hashed iteratively (four times) using SHA-2 to produce 256*4 bits. Call the output d1, d2, d3, d4. More precisely, d1=SHA-2(c); d2=SHA-2(d1); d3=SHA-2(d2); d4=SHA-2(d3);

3. Out of the 256*4 bits of d1, d2, d3, d4, 64*13 bits of d1, d2, d3, d4 are used to obtain the permutation P. A permutation P of 128 bits can be specified by 64*(2*log 128−1) bits, i.e. 64*13 bits. More specifically, in one exemplary embodiment, the bits are taken directly from d1, d2, d3, d4 (i.e., collect the first 13*64 bits out of 16*64 bits of d1, d2, d3, d4 . . . these 13*64 bits specify the permutation, and they are fed into the 13*64 2 by 2 switches in the permutation network. Each switch (i.e., 2 by 2 switch) takes one such input bit other than the two lines of wires it is trying to switch or not switch.

4. A permutation of the secret k (considering two consecutive bits as a nibble) is performed in the chip 104 using P. In other words, k[0 . . . 1], k[2 . . . 3], . . . etc are considered as 128 nibbles and permuted using P. The actual permutation is implemented as 13 rounds of a Benes network (each round taking 64 bits from P). Each round of a Benes network is a parallel set of 64 2 by 2 switches (the switch being decided by the 64 bits of P for this round). A following recursive definition of a Benes network is sufficient. A Benes network on $2^r$ bits consists of three divisions: two outer layers of $2^{\{r-1\}}$ 2 by 2 switches (call them left and right layers), and an inner division consisting of two independent Benes networks on $2^{\{r-1\}}$ bits. The output of the left layer is fed into the two smaller Benes networks as follows: All odd number output bits are sent to the first smaller Benes network, and all even numbered output bits are sent to the second smaller Benes Network. The outputs from the smaller Benes network are then symmetrically fed into the right layer. Note that this leads to a total of (2r−1) layers of $2^{\{r-1\}}$ parallel 2 by 2 switches.

The above explanation is perhaps clarified using the 8-bit Benes network shown in FIG. 3 where r=4. Note that the Benes network is a fixed circuit, and any particular permutation is brought about in the present invention by the 13*64 bits, each one such bit going to each of the 13*64 switches inside the permutation network.

5. Let the final output of k permuted according to P be called K' (i.e. 256 bits).

6. Next, d4 is hashed again using SHA-2 to obtain d5; i.e. d5=SHA-2(d4); Let the first 128 bits of d5 be called e1, and the second 128 bits of d5 be called e2;

7. Next, produce a concatenation of e1; k'; e2 (i.e. 512 bits).

8. Hash these 512 bits using SHA-2 to obtain z.

9. Output z (e.g., MAC) to the server via the wand 106.

10. The server does the same computation on its own secrets (i.e. first encoding it into k) and the challenge c. If the results match z then the server outputs "authenticated" else it output "not authenticated". In the exemplary embodiment, once the wand 106 receives notification of authentication from the Fed server 108, then the bill 102 is considered "good" (e.g., authenticated, and the wand 106 could display either a "pass" or "not pass" indication to the user.

11. While these exemplary embodiments have been described, many other similar embodiments can be obtained by variations in how the hashes are performed, the encodings are performed, as well as doing the computation in step 7 and 8 on only a subset of bits from k', and as to how this subset is decided based on challenge c, as well as other variations.

An Exemplary EM-Attack

Presuming the above-recited exemplary protocol, an adversary can launch a side channel attack by supplying the chip a challenge c and observing the EM radiation emanating from the chip. The first time the secret $k_s$ is involved at all is in computation of $p_s$ in the Benes network. Note that the permutation r is known to the adversary in this side channel attack. Thus, if the EM radiation profile on switching a 0 value (i.e., 01 encoding) is different from switching a 1 value (i.e., 10 encoding), say in bit location one of $k_s$, the adversary is in business. Clearly, this radiation profile is muddled by all the other simultaneous switchings happening, as well as by many other environmental factors emanating from inside and outside the chip. So, one can expect that the EM profile will be a normal distribution with mean $\mu 0$ (with variation a) if the secret in bit location one is 0 (or 01 encoding) vs a mean of $\mu 1$ (with about the same variation a) if the secret in bit location one is 1 (i.e., 10 encoding). Ideally, a will be large enough, so that a huge number of samples would be required (note the adversary can try different values of c such that the value r is same in the Benes network level one, bit location one).

Now, depending on the size of this a, one must ensure that an adversary cannot obtain so many samples in a small amount of time (say, one year, because after that it just would not make economic sense for the adversary to expend so much resource to get the secret of one bill). So, for this, in one exemplary embodiment, the following counter-measure is additionally incorporated.

No Re-Boot for Ten Seconds

Since the chip depends on power charge from a wireless power source, the chip design can ensure that it will not start computing the Benes network, unless its battery has a minimal charge which allows it to not only compute the full output but also, keep running for 10 seconds. During that time, it cannot be re-booted.

Two Exemplary Schemes Using the Permutation-Based Approach

The remainder of this description describes two different schemes that would implement the permutation-based approach described above.

The first scheme does not use any public key operations (e.g., RSA, a well-known public-key cryptosystem widely used for secure data transmission, in which encryption key is public and differs from the decryption key which is kept secret) on the chip. It also does not need a random number generator (RNG) on the chip. However, its security is highly contingent on the hardware design. Also, error-correcting codes like Reed-Solomon codes can be used in this scheme provided the decoding algorithm is modified to use a permutation. However, there is an alternate way to handle errors in the secret key, which will be described toward the end of this discussion.

The second scheme requires a public-key based signature scheme (with the signing key held by the Fed—and not the wand). The corresponding public key will be embedded in each chip. The chip must do signature verifications. Also, a challenge-response protocol requires that the chip receive a (pure) random number generator. The down side of this implementation is two-fold (a) The same signing key will have to be used for the lifetime of the bills (20 years?). This signing key might be used rather extensively every day for 20 years. For a partial transition after 10 years, both signing keys will be have to be around to deal with two kinds of bills (the older and the newer).

(b) Before a batch of bills can be verified, the wand must interact with the batch of chips (e.g., bills), obtain a nonce for each, communicate with the Fed to get one signature (for the whole batch of bills), and then communicate with each chip again and retrieve authentication information which is then shipped back to the Fed (for verification). For clarification, a "nonce" is well understood in the art of security engineering as referring to a number or bit string used only once, in security engineering Both schemes require SHA-2 implementation (and no other primitives other than mentioned above) on the chip. Thus, the first alternative will only require SHA-2 implementation, and the second will require SHA-2, RSA signature verification and a random number generator (RNG).

Scheme 1: No Public-Key Solution with EM-Resistant Protocol Using SHA-2

In this first of the two schemes, a key idea is to compute a permutation r (of 128-bits) from c. Then, instead of computing output as above, the chip computes:

v←SHA-2(c); u←SHA-2((v, s, π($k_s$))); Output←SHA-2 (u, v).

More precisely, the steps are as follows:

v1←SHA-2(c);

Use 128 log 128 bits from v1 to define a 128-bit permutation r.

v2←SHA-2(v1);

$p_s$=Benes-Network(π,$k_s$);

u←SHA-2((v2, s,$p_s$));

Output←SHA-2(u,v2).

Each bit in $k_s$ (i.e. 128 bits) will be stored in a 2-bit encoding; a bit with value 0 will be stored as 01 and a bit with value 1 will be stored as 10. The Benes-network will thus operate on 128 2-bit words. Thus, in the above, the value $p_s$ will be a 256-bit quantity (or all odd-numbered bits can be dropped to get back a 128-bit quantity). All steps in each level of the Benes-network should preferably be done simultaneously. If this is not possible, as many steps as possible should be done in parallel.

Note that the Fed can compute the exact same (MAC) Output given c and the serial number s (as long as corresponding $k_s$ in its database is same as the $k_s$ on the chip).

Scheme 2: Public-Key Signature-Based Scheme

In this second scheme, the above computation of SHA-2 on $k_s$ is not even started unless the chip can authenticate that it got the challenge c from a legitimate source. For this end, the source must sign c with a signing key whose public counterpart is pre-stored in the chip (in a non-malleable fashion). The chip starts off by generating a 64-bit nonce n and sending it to the challenger. The challenger then generates c, and signs the SHA-2 hash of (n, c). It then sends the signature along with c to the chip, which can then verify the signature. Clearly, a replay of the signature will not work as the chip supplied a 64-bit nonce, and the adversary will need to store a huge table of size 264 (or thereabouts) of evesdropped signatures to be able to fool the chip.

Now, the question arises if the wand has the signing capability, which is a dangerous proposition since a stolen wand will render signatures useless. Thus, the signatures must come from the Fed. Fortunately, the following scheme allows the Fed to only do one signature per batch of bills (say 100 or 1000 bills).

The wand collects pairs $(S_i, n_{si})$ from each bill $s_i$ in the stack of bills (e.g., say i varies from 1 to 100). It then computes a Merkle-tree SHA-2 hash h of these pairs, with each $(S_i, n_{si})$ as a leaf. The Merkle-tree hash h is sent to the Fed. The Fed computes a further SHA-2 hash of h to obtain w and signs w and returns the signature to the wand.

It is noted, for clarity, that a Merkle tree, also referred to in the art as a hash tree, is a tree in which every non-leaf node is labelled with the hash of the labels or values (in case of leaves) of its child nodes. Hash trees allow efficient and secure verification of the contents of large data structures.

The wand then sends the signature to each chip, along with the SHA-2 hashes along the Merkle tree which correspond to the path to the root from this chip's leaf. The chip can then validate the signature by computing about log 100 SHA-2 hashes and one public-key signature verification.

Note that if desired, the Merkle-tree can be of any depth, say log 1000 to even as low as log 2(=1). The latter case would just mean more overhead for the Fed signing server and less work for each chip.

Once the signature is validated, the chip can compute the SHA-2 hash using the challenge c and its secret $k_s$ by v←SHA-2(c); u←SHA-2((v, s, $\pi(k_s)$)); Output←SHA-2 (u, v)

Note there is no need to include a nonce in this step.

Error Handling

There are many places that errors can happen. For example, there can be errors in communication, such as between the chip and the wand, but these can be handled by hashing the whole message (using SHA-2) and requesting the message to be sent again if the hash of the message does not match (either direction).

More challenging is handing errors in the stored value of $k_s$. Any attempt to error-correct $k_s$ while reading it may give a strong EM signal to an Adversary. This is not a concern in the public-key based solution, as no processing of $k_s$ is done till the wand is authenticated. However, in the non-public-key solution this is definitely a serious issue. But, in this case, after the bits are permuted, error-correcting codes decoding can be used and will work if the syndrome calculator is also given access to the permutation 7 and it incorporates 7 in the syndrome calculation.

Another way to handle errors is to have a 256-bit key $k_s$ instead of the 128-bit key required above. Next, as usual in the 2-bit encoding, it will be represented by 512 bits. Use the Benes network to permute the 256 bits of $k_s$ now. However, instead of doing the rest of the SHA-2 MAC computation on this permuted $k_s$ (i.e., ps), compute the MAC only on the first 128 bits of ps (i.e., ignore the last 128 bits). Now, note that if there was a single bit error in $k_s$, then after the permutation, with probability ½ that erroneous bit will just get dropped.

The Fed will do the identical MAC computation (i.e. by dropping the last 128 bits of the permuted secret).

If the erroneous bit(s) was in the front 128-bits, clearly the MACs will not match, but the whole protocol can be repeated, and a new c will lead to a completely new permutation.

This methodology can also be used in the public-key signature based scheme, but now that scheme must also implement a permutation. Alternatively, it can compute a 256 bit mask from c or v (using SHA-2) and with high probability it will have about 128-bits ON. Then the masked bits can be AND-ed with the 256-bit key $k_s$, and hash computed on this masked 256-bit quantity. Again, with probability ½ an erroneous bit will just get masked-off and hence MAC computation will come out matching the one performed by the Fed.

Figure 4:
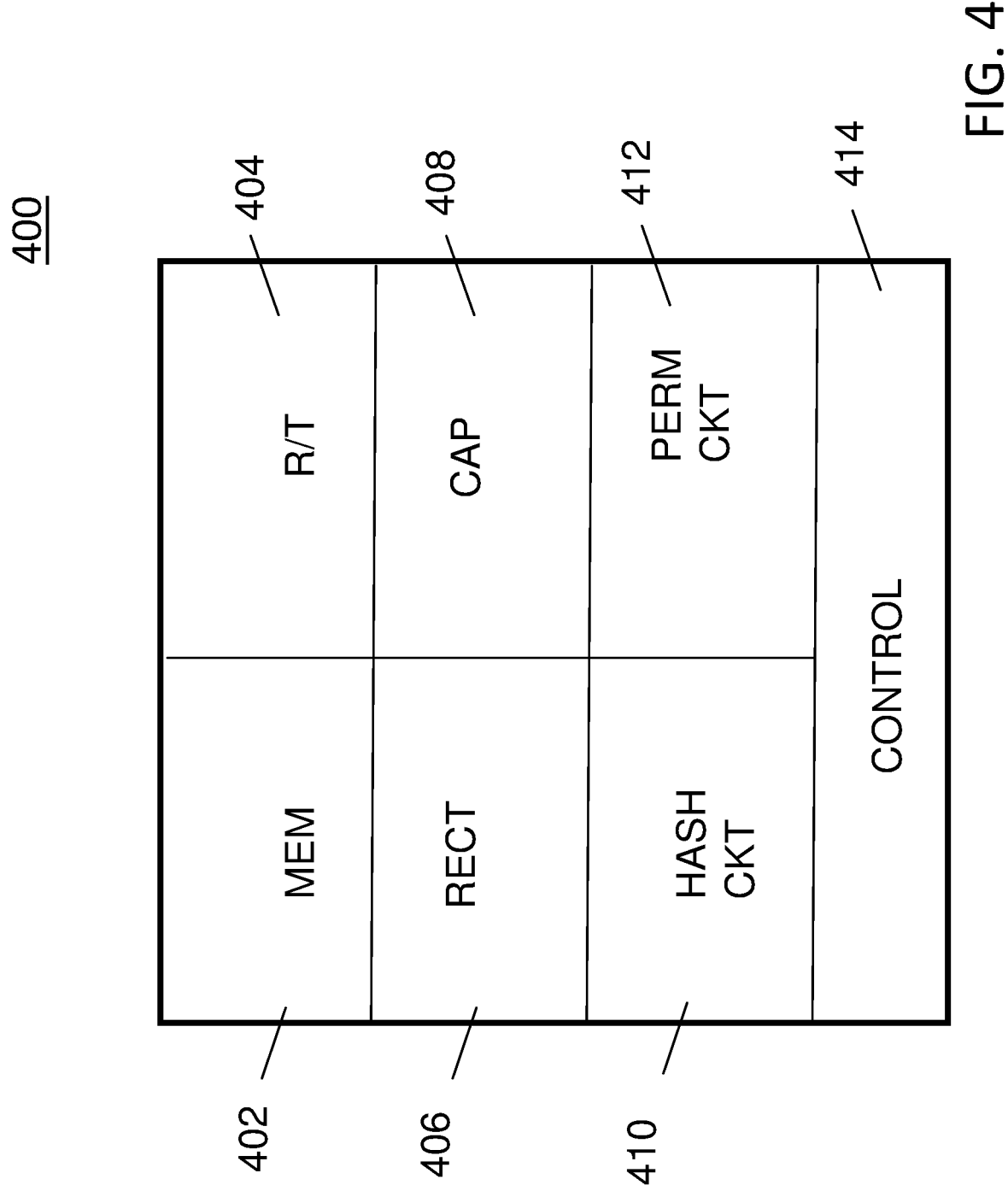
FIG. 4 shows in block diagram format 400 the components of an exemplary device in accordance with the present invention.

FIG. 4 shows in block diagram format 400 the hardware aspects of chip 104 used to explain the present invention. Non-volatile memory device 402 is used to store the secret k assigned to the chip 104. Receive/transmit (R/T) unit 404 includes a microstrip RF antenna to intercept EM broadcast by the wand 106 as RF energy. The antenna could include an RF filter to intercept the intended RF frequency and exclude other frequencies. The RF filter could be partially based on parasitic reactance of other components attached to the antenna, such as a rectifier function 406 to convert the received RF into direct current (DC) to be storage by a capacitor 408, as sized to power the chip, for example, for a ten-second period during which one authentication cycle is executed. The RT unit 404 would also include receive and transmit functions to receive information from the wand 106 and to transmit its calculated MAC. The hash unit 410 is a standard hash circuit, as implemented in hardware, and was exemplarily a single standard 128-bit SHA-2 hardware circuit in the exemplary embodiment. Permutation unit 412 is also a standard permutation circuit, as implemented in hardware, and was exemplarily a single 128-bit Benes network implemented in hardware in the exemplary embodiment. Various registers would be used to temporarily store input challenge data received from the wand 106, to store the MAC for transmission, to store the secret k as retrieved from memory device 402, and to temporarily store calculation data during the hash/permutation processing described above. Since various register configurations would be possible, including configurations in which only a few registers are used, as controlled to receive data and to release data for the next step of processing, as controlled by a sequence defined in control unit 414. Controller 414 controls how the data moves through the hash and permutation hardware and could be any simple sequential control circuit since its only function is the movement of data through the hash and permutation circuits by controlling data flow through the hash and permutation circuits by controlling registers and by appropriately enabling the hash and permutation circuits, as well as controlling the transmission of the final result, the MAC. Accordingly, the control unit 414 could be a simple sequential program such as a finite state machine or a sequence of instructions stored in non-volatile memory device 402.

In another embodiment of this invention, the chip also stores a non-secret value, known as salt. This salt is chosen randomly, and can be a 64-bit quantity. It is stored on the chip during manufacturing or by any other means. This is in addition to the secret value $k_s$. In this variant, the permutation is computed using both the challenge c and the salt. More precisely, the step 2(*a*) in the exemplary protocol described above now becomes:

(a) Upon receipt in the chip 104, the challenge c is hashed iteratively (four times) using SHA-2 to produce 256*4 bits. Call the output d1, d2, d3, d4. More precisely, d1=SHA-2(c, salt); d2=SHA-2(d1); d3=SHA-2(d2); d4=SHA-2(d3);

The salt value is also stored at the server along with the serial number s of the chip. Alternatively it can be transmitted to the server in the clear along with the computed MAC.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  receiving a challenge of an authentication, in a chip having stored in a memory device therein a secret that is used in an authentication attempt of said chip by an external agent, said chip comprising a hardware processing circuit that sequentially performs a processing related to said secret and the challenge;
  using said received challenge to derive a permutation;
  retrieving said secret from said memory device;
  permuting said secret by said hardware processing circuit including a permutation network using said derived permutation; and
  transmitting a result of said permuting in said hardware processing circuit as a response to said challenge, wherein said hardware processing circuit comprises the permutation network,
  wherein the permutation network comprises a plurality of rounds and executes in a parallel manner in each round of the permutation network, to reduce a signal that can be detected by an adversary attempting a side channel attack to secure said secret, and
  wherein the permutation comprises re-ordering the secret in a set in accordance with a permutation code supplied by the challenge.

2. The method of claim 1, wherein the hardware processing circuit sequentially performs the processing related to said secret and said received challenge,
  wherein the processing includes permuting said secret using the permutation network, wherein the permutation network comprises a Benes network or a butterfly network,
  wherein said permutation network executes in a parallel manner, to reduce the signal that can be detected by the adversary attempting a side channel attack to secure said secret.

3. The method of claim 1, wherein said permutation network comprises a butterfly network or a Benes network,
  wherein the processing is performed in each round of the permutation network in parallel, to reduce the signal that is detected by the adversary attempting a side channel attack to secure said secret.

4. The method of claim 1, further comprising performing a plurality of hashing operations on said received challenge to derive a permutation of said secret being implemented as an input into said permutation network.

5. The method of claim 4, wherein the hashing operations are implemented in a hardware Secure 1-lash Algorithm 2 (SHA-2) circuit.

6. The method of claim 1, wherein said device receives a power for operation by intercepting radio frequency waves emanating from an external device sufficiently close in proximity to charge up a transitory internal power system, and
  wherein the permutation is performed using multiple switching stages of the permutation network.

7. The method of claim 6, wherein said device further comprises a time delay mechanism that precludes repeating said method within a predetermined time interval.

8. The method of claim 1, further comprising converting each bit of the secret into a predetermined plurality of bits as the secret is retrieved from memory and presented for said parallel permutation processing, and
  wherein the permutation network executes in a parallel manner, to reduce the signal that can be detected by the adversary attempting a side channel attack to secure said secret.

9. A method, comprising:
  receiving a challenge for an authentication, in a chip having stored in a memory device therein a secret is used in an authentication attempt of said device by an external agent, said device comprising a hardware hashing circuit and a hardware permutation circuit including a permutation network that performs processings on said received challenge and said secret;
  hashing said received challenge in said hardware hashing circuit a plurality number of times;
  deriving a permutation from a result of said hashing;
  retrieving said secret from said memory device;
  processing said secret using said derived permutation in said permutation network and wherein said permutation network comprises a plurality of rounds and executes in a parallel manner in each round of the permutation network; and
  transmitting a result of said processing as a response to said challenge,
  wherein the permutation comprises re-ordering the secret in a set in accordance with a permutation code supplied by the challenge.

10. The method of claim 9, wherein the hardware processing circuit sequentially performs the processing related to said secret and said received challenge,
  wherein the processing includes permuting said secret using the hardware permutation circuit comprising the permutation network including a Benes network or a butterfly network which is part of said hardware processing circuit, and
  wherein said hardware permutation circuit comprising the Benes network or the butterfly network executes in a parallel manner, to reduce the signal that can be detected by the adversary attempting a side channel attack to secure said secret.

11. The method of claim 9, wherein said permutation network comprises a butterfly network or a Benes network.

12. The method of claim 9, wherein the hardware hashing circuit comprises a hardware Secure Hash Algorithm 2 (SHA-2) circuit.

13. The method of claim 9, wherein said device receives a power for operation by intercepting radio frequency waves emanating from an external device sufficiently close in proximity to charge up a transitory internal power system, and
   wherein the permutation is performed using multiple switching stages of the permutation network.

14. The method of claim 13, wherein said device further comprises a time delay mechanism that precludes repeating said method within a predetermined time interval.

15. A chip, comprising:
   a non-volatile memory device storing a secret;
   a receive/transmit (R/T) unit operating in a radio frequency (RF) wavelength;
   a power supply unit that converts RF energy received from said R/T unit into a direct current (DC) and stores said converted DC as a power source for operation of circuits in said chip;
   a hardware hash circuit;
   a hardware permutation circuit that includes a permutation network that comprises a plurality of rounds and executes in a parallel manner in each round of the permutation network; and
   a control unit,
   wherein said control unit, upon receiving a voltage from said power source, operates a method to:
      receive a challenge for an authentication, by an external agent, via said R/T unit;
      hash said received challenge in said hardware hash circuit a plurality number of times;
      derive a permutation from a result of said hashing;
      retrieve said secret from said memory device;
      process said secret and said permutation in said hardware permutation circuit as a parallel processing using said derived permutation; and
      transmit a result of said processing as a response to said challenge, via said RIT unit,
      wherein the permutation comprises re-ordering the secret in a set in accordance with a permutation code supplied by the challenge.

16. The chip of claim 15, wherein the hardware processing circuit sequentially performs the processing related to said secret and said received challenge,
   wherein the processing includes permuting said secret using hardware permutation circuit comprising a Benes network or a butterfly network which is part of said hardware processing circuit, and
   wherein said hardware permutation circuit comprising the Benes network or the butterfly network executes in a parallel manner, to reduce the signal that can be detected by the adversary attempting a side channel attack to secure said secret.

17. The chip of claim 15, wherein said hardware permutation circuit comprises a hardware butterfly network circuit or Benes network circuit.

18. The chip of claim 15, wherein hardware hash circuit comprises a hardware Secure Hash Algorithm 2 (SHA-2) circuit.

19. The chip of claim 15, wherein said device further comprises a time delay mechanism that precludes repeating said method within a predetermined time interval.

20. The chip of claim 15, as embedded in an entity that represents a monetary value and wherein said external agent comprises a server on a network and said challenge is received by said chip via a wand that provides RF energy to said chip for operation, and
   wherein the permutation is performed using multiple switching stages of the permutation network.

* * * * *